(12) United States Patent
Beier et al.

(10) Patent No.: US 12,146,540 B2
(45) Date of Patent: Nov. 19, 2024

(54) METHOD FOR ADJUSTING THE CLEARANCE OF AN ELECTROMECHANICAL BRAKE, BRAKE, AND CONTROL DEVICE

(71) Applicant: ZF CV Systems Europe BV, Brussels (BE)

(72) Inventors: Peter Beier, Wunstorf (DE); Arne Reiners, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 678 days.

(21) Appl. No.: 17/417,144

(22) PCT Filed: Dec. 10, 2019

(86) PCT No.: PCT/EP2019/084428
§ 371 (c)(1),
(2) Date: Jun. 22, 2021

(87) PCT Pub. No.: WO2020/143973
PCT Pub. Date: Jul. 16, 2020

(65) Prior Publication Data
US 2022/0065316 A1    Mar. 3, 2022

(30) Foreign Application Priority Data
Jan. 10, 2019   (DE) .................... 10 2019 100 481.0

(51) Int. Cl.
*F16D 65/38*   (2006.01)
*B60T 13/66*   (2006.01)
(Continued)

(52) U.S. Cl.
CPC ............ *F16D 65/38* (2013.01); *B60T 13/662* (2013.01); *B60T 17/221* (2013.01);
(Continued)

(58) Field of Classification Search
CPC ...... F16D 65/38; F16D 55/226; F16D 66/026; F16D 2065/386; F16D 2066/003; F16D 2121/24; B60T 13/662; B60T 17/221
See application file for complete search history.

(56) References Cited

U.S. PATENT DOCUMENTS 6,238,011 B1 * 5/2001 Heckmann ............ B60T 8/3255
                                                                 188/71.7
6,279,694 B1 * 8/2001 Bohm ..................... B60T 17/22
                                                                 188/162

(Continued)

FOREIGN PATENT DOCUMENTS

AT          516801 A2    8/2016
CN      105190077 A    12/2015
(Continued)

OTHER PUBLICATIONS

European Patent Office, Rijswijk, Netherlands, International Search Report of International Application No. PCT/EP2019/084428, Mailed Apr. 22, 2020, 2 pages.

*Primary Examiner* — Thomas W Irvin
(74) *Attorney, Agent, or Firm* — Dickinson Wright PLLC

(57) ABSTRACT

A method for adjusting the clearance of an electromechanical brake, in particular of a utility vehicle brake, involves the following steps: activating a clearance test cycle for the brake, applying at least one brake lining of the brake in the direction of a brake disc and determining a contact position in which the brake lining enters into contact with the brake disc when application occurs, determining the clearance as well the degree of wear of the lining on the basis of the determined contact position, calculating the clearance which is necessary for the brake and a necessary contact position of the brake lining and brake disc in accordance with the
(Continued)

degree of wear of the lining using predefined parameters. The method is performed by a suitable brake and a control device.

18 Claims, 3 Drawing Sheets

(51) Int. Cl.
| | | |
|---|---|---|
| *B60T 17/22* | (2006.01) | |
| *F16D 55/226* | (2006.01) | |
| *F16D 66/02* | (2006.01) | |
| *F16D 66/00* | (2006.01) | |
| *F16D 121/24* | (2012.01) | |

(52) U.S. Cl.
CPC ......... *F16D 55/226* (2013.01); *F16D 66/026* (2013.01); *F16D 2065/386* (2013.01); *F16D 2066/003* (2013.01); *F16D 2121/24* (2013.01)

(56) References Cited

U.S. PATENT DOCUMENTS

| | | | | |
|---|---|---|---|---|
| 9,457,782 | B2* | 10/2016 | Yao | ............................ B60T 7/22 |
| 10,422,396 | B2* | 9/2019 | Yao | ........................ B60T 1/065 |
| 2007/0235267 | A1* | 10/2007 | Liebert | ................... B60T 7/108 |
| | | | | 188/71.7 |
| 2008/0283346 | A1* | 11/2008 | Ralea | .................... B60T 13/741 |
| | | | | 188/156 |
| 2010/0168979 | A1* | 7/2010 | Baier-Welt | .............. F16D 65/14 |
| | | | | 701/76 |
| 2013/0105254 | A1* | 5/2013 | Isono | .................... B60T 13/745 |
| | | | | 188/72.3 |
| 2015/0047929 | A1* | 2/2015 | Narula | ...................... B60T 7/22 |
| | | | | 188/71.8 |
| 2015/0330470 | A1* | 11/2015 | Siebke | ................. F16D 55/225 |
| | | | | 73/9 |
| 2016/0017946 | A1* | 1/2016 | Sandberg | ............ F16D 55/2265 |
| | | | | 188/71.8 |
| 2016/0076609 | A1* | 3/2016 | Narula | .................. F16D 55/226 |
| | | | | 188/73.33 |
| 2021/0197777 | A1* | 7/2021 | Itakura | .................... B60T 1/065 |
| 2022/0073049 | A1* | 3/2022 | Beier | .................... B60T 13/662 |

FOREIGN PATENT DOCUMENTS

| | | |
|---|---|---|
| CN | 108291592 A | 7/2018 |
| DE | 19730094 A1 | 1/1999 |
| DE | 19826133 A1 | 12/1999 |
| DE | 10138452 A1 | 2/2003 |
| DE | 102012007021 B3 | 8/2013 |
| EP | 2631503 A1 | 8/2013 |
| FR | 2060885 A5 | 6/1971 |

* cited by examiner

METHOD FOR ADJUSTING THE CLEARANCE OF AN ELECTROMECHANICAL BRAKE, BRAKE, AND CONTROL DEVICE

TECHNICAL FIELD

The invention relates to a method for adjusting a clearance of an electromechanical brake, in particular a commercial vehicle brake, as well as a brake and a control device suited for performing the method.

BACKGROUND

Electromechanical brakes with drives for generating a braking torque are widely known in the motor vehicle industry, particularly in the commercial vehicle industry. Thus, AT 516 801 A2, for example, discloses such a brake with an electromechanical brake actuator. The general aim is to operate a brake with electrical energy. A significant challenge here is to achieve sufficiently short brake actuation times.

In order to achieve constant and short brake actuation times and in order to achieve a constant application force, the adjustment of the so-called clearance plays a central role. In this context, the term "clearance" denotes the distance between at least one brake pad and the brake disc of a brake in the unbraked state. In the case of braking, the clearance must be overcome by a brake pad applied in the direction of the brake disc before there is a mechanical frictional effect between the brake disc and the brake pad and thus a braking effect occurs.

Owing, inter alia, to progressive wear of the brake pads over their service life, the clearance is subject to wear-induced changes. For mechanical brakes, in particular commercial vehicle brakes, the prior art discloses mechanical clearance adjustment devices which adapt the clearance mechanically to increasing wear of the brake pads.

However, the described prior art has the disadvantage that such mechanical clearance adjustment devices for electromechanical brakes can either not be used or cannot be used with the desired result. The same applies to the methods already known from the prior art for adjusting the clearance, which are likewise insufficiently suitable for use with electromechanical brakes.

SUMMARY

Against this background, the object underlying the invention was to develop a method of the type mentioned at the outset in such a way that the disadvantages found in the prior art were as far as possible eliminated. In particular, a method for adjusting a clearance is to be specified which makes it possible to adjust a clearance in electromechanical brakes in a simple and reliable manner.

According to the invention, the problem is solved in a method of the type mentioned at the outset by the steps of: activating a clearance test cycle for the brake, applying at least one brake pad of the brake in the direction of a brake disc and determining a contact position, at which the brake pad comes into contact with the brake disc during application, determining the clearance and a degree of pad wear on the basis of the determined contact position, calculating a clearance required for the brake and a required contact position of the brake pad and brake disc as a function of the degree of pad wear using predefined parameters.

The method is based on the recognition that it has proven to be preferable to first determine the actual state of the clearance of a brake. According to the invention, this is achieved by applying the at least one brake pad of the brake and then determining the position at which the brake pad comes into contact with the brake disc. According to the invention, a degree of pad wear is determined on the basis of the determined contact position, and in this way the actual state of the brake with respect to pad wear is reliably determined.

A required clearance and a required contact position for the prevailing degree of pad wear of the brake pads and of the brake as a whole are then determined on the basis of the degree of pad wear and using stored parameters. By means of the method according to the invention, it is thus possible to reliably and accurately determine not only the actual state of the pad wear but also an optimum clearance for this degree of wear or a contact position which is optimum for this purpose.

The invention is further developed by the method step of: comparing the determined contact position with the required contact position and/or the determined clearance with the required clearance, wherein, in the case where the determined contact position deviates from the required contact position and/or the determined clearance deviates from the required clearance by less than a tolerance value, a braking readiness signal is generated.

In other words, if the difference between the determined clearance and the required clearance and/or the determined contact position and the required contact position is sufficiently small, that is to say if it falls below a tolerance value, the brake is ready for operation, such that an adaptation of the clearance is not necessary. In this case, a braking readiness signal is generated which preferably signals readiness of the brake to the corresponding vehicle systems.

According to a preferred development of the method, in the case where the determined contact position deviates from the required contact position and/or the determined clearance deviates from the required clearance by more than a tolerance value, a required clearance adjustment distance is calculated.

In this method step, in the case where the deviation between the determined contact position and the required contact position and/or the determined clearance from the required clearance is greater than a tolerance value, that clearance adjustment distance which is required to adapt and correct the determined clearance is calculated. If an adjustment of the clearance is then performed on the basis of the determined values, the clearance test cycle consequently also includes a clearance adjustment routine.

The method preferably has the further steps of: adjusting the clearance according to the calculated required clearance adjustment distance and reactivating the clearance test cycle for the brake.

On the basis of the calculated required clearance adjustment distance, the clearance is adjusted in these method steps, with the aim of reducing the deviation between the adjusted clearance and the required clearance to a value which is smaller than the tolerance value.

The method is furthermore developed in that, in the case where no contact position or no clearance can be found for which the determined contact position deviates from the required contact position and/or the determined clearance deviates from the required clearance by less than a tolerance value, an error signal is generated.

In other words, it is proposed according to the invention to interrupt the looped running of the clearance test cycle by an abort condition. In the case where no clearance could be found which lay within the tolerance range of the required clearance, there would, according to the method, be continuous attempts to adjust the clearance without such an abort condition. If, for various reasons, it is not possible to adjust the clearance in the desired manner, even after multiple runs of the clearance test cycle for example, provision is preferably made for the clearance test cycles to be interrupted and for an error signal to be generated.

In a preferred embodiment, the error signal is generated after running through a certain number of unsuccessful clearance test cycles, and the cycle is preferably stopped.

According to a further preferred embodiment, the clearance test cycle is stopped when the difference between the determined clearance and the required clearance is greater in one clearance test cycle than in the previous clearance test cycle.

It is furthermore preferred that the predefined parameters comprise a brake characteristic curve and/or stiffness characteristic map, in which state-dependent stiffness values are stored. By means of the predefined parameters, conclusions can be drawn, in particular on the basis of the degree of pad wear, on the brake stiffness for a given pad wear for example, and a clearance required for these boundary conditions can then be determined.

Adjustment of the clearance is preferably carried out by means of an electric clearance adjustment device, in particular by means of an electric drive. In this case, the clearance adjustment device preferably has a transmission which is coupled to the electric drive and by means of which the rotational movement of the motor is transformed into a translational movement for adjusting the clearance. The electric drive is preferably configured as an electric motor with or without a rotary encoder.

The invention is further developed in that the calculation of the required clearance adjustment distance comprises the determination of parameters for the electric clearance adjustment device, in particular the specification of an adjustment position for the electric drive.

In this way, an electric drive can be controlled directly by specifying an adjustment position in such a way that it adjusts the clearance in the desired manner and by the desired distance.

It is furthermore preferred that the activation of the clearance test cycle takes place each time before the vehicle is put into operation, in particular by activation of a vehicle ignition. The activation and running of the clearance test cycle each time before the vehicle is put into operation has proven to be preferable for safety reasons. Coupling the activation of the clearance test cycle with the vehicle ignition has proven to be a particularly reliable and simple way here of ensuring that the clearance test cycle is run through each time the vehicle is put into operation.

The invention has been described above with reference to a method for adjusting a clearance of an electromechanical brake. In a further aspect, the invention relates to a method for adjusting a clearance in a vehicle having a plurality of electromechanical brakes, in particular a commercial vehicle.

The invention achieves the object designated at the outset by carrying out the method for adjusting a clearance according to one of the preferred embodiments described above for each of the brakes of the vehicle.

In this case, the clearance test cycle of a brake is preferably activated only for a first number of the electromechanical brakes, which is less than the total number of electromechanical brakes present on the vehicle.

At the same time, the relevant method features have proven to be particularly advantageous in the case where the electromechanical brakes are used to generate a holding braking force on the vehicle immediately after the vehicle has been started. If, for example, all four brakes of a vehicle were to run simultaneously through the clearance test cycle according to the invention, then under certain circumstances no braking force would be available for the vehicle for a short time during the run through the test cycle. For this reason, it has proven to be particularly suitable, depending on the type of vehicle and the environmental conditions, to coordinate the number of brakes of a vehicle which run simultaneously through a clearance test cycle. For example, in the case where a high holding braking force is required, it has proven useful to activate the clearance test cycle simultaneously for only one of the plurality of brakes of a vehicle.

In a further aspect, the invention relates to a control device for adjusting a clearance of an electromechanical brake, in particular a commercial vehicle brake, having a first interface for the signal-conducting connection of the control device to a brake actuator, a second interface for the signal-conducting connection of the control device to a clearance adjustment device, a data memory and a processor.

The invention achieves the object designated at the outset in respect of the control device in that the control device is configured to activate a clearance test cycle for a brake, to bring about application of at least one brake pad of the brake in the direction of a brake disc and to determine a contact position, at which the brake pad comes into contact with the brake disc during application, to determine the clearance and a degree of pad wear on the basis of the determined contact position, and to determine a clearance required for the brake and a required contact position of the brake pad and brake disc as a function of the degree of pad wear using predefined parameters.

Here, the control device is preferably assigned to an electromechanical brake in each case. According to an alternative embodiment, the control device is configured to perform a clearance test cycle for a plurality of electromechanical brakes.

According to a preferred development, the control device is furthermore configured to compare the determined contact position with the required contact position and/or the determined clearance with the required clearance, wherein, in the case where the determined contact position deviates from the required contact position and/or the determined clearance deviates from the required clearance by less than a tolerance value, a braking readiness signal is generated, and wherein, in the case where the determined contact position deviates from the required contact position and/or the determined clearance deviates from the required clearance by more than a tolerance value, a required clearance adjustment distance is calculated.

In summary, the comparison according to the invention provides essentially two possible results. For a first case, in which the determined contact position deviates from the required contact position or the determined clearance deviates from the required clearance by no more than a tolerance value, the brake is ready for operation and a braking readiness signal is generated.

However, if the comparison shows that the determined contact position and the determined clearance deviate from the setpoint values by more than a tolerance value, then a required clearance adjustment distance is determined, with the aim of adjusting the clearance by this distance and ensuring that the clearance adjusted in this way is within the tolerance.

As a further preference, the control device is configured to adjust the clearance according to the calculated required clearance adjustment distance, and to reactivate the clearance test cycle for the brake. According to the invention, the clearance is adjusted in these method steps, namely according to the calculated required clearance adjustment distance, and then the clearance test cycle is reactivated in order to ensure that the adjustment of the clearance was successful to this extent and the adjusted clearance lies within the tolerance range of the required clearance.

It is furthermore preferred that the control device is configured to execute one, a plurality or all of the method steps of the method according to the first exemplary embodiment.

In a further aspect, the invention relates to an electromechanical brake, in particular for commercial vehicles, having a brake disc, at least one brake pad accommodated in a brake caliper, an electromechanical brake actuator for applying the at least one brake pad in the direction of the brake disc, a clearance adjustment device for adjusting the clearance between the brake disc and the brake pad, and a control device.

The invention achieves the object designated at the outset with respect to the electromechanical brake by configuring the control device according to one of the preceding exemplary embodiments.

The invention furthermore achieves the object designated at the outset with respect to a computer program product which comprises instructions that execute the method according to one of the exemplary embodiments associated with the method on a control device according to one of the abovementioned exemplary embodiments.

The electromechanical brake and the computer program product make use of the same advantages and preferred embodiments as the method according to the invention and the control device according to the invention. Reference is made in this regard to the above explanations, and their content is incorporated here.

Exemplary embodiments of the invention are now described below with reference to the drawings. These are not necessarily intended to represent the exemplary embodiments to scale; on the contrary, the drawings are executed in schematic and/or slightly distorted form, where useful for explanation. With regard to additions to the teachings directly recognizable from the drawings, attention is drawn to the relevant prior art. It should be borne in mind here that many modifications and changes relating to the form and detail of an embodiment can be made without departing from the general concept of the invention. The features of the invention which are disclosed in the description, in the drawings and in the claims may be essential for the development of the invention, both individually and in any desired combination. Moreover, all combinations of at least two of the features disclosed in the description, in the drawings and/or in the claims fall within the scope of the invention. The general concept of the invention is not limited to the exact form or detail of the preferred embodiment shown and described below, nor is it limited to subject matter which would be restricted in comparison with the subject matter claimed in the claims. In the case of specified dimensioning ranges, the intention is also to disclose values lying within the limits mentioned as limit values and to allow for them to be used and claimed in any way. For the sake of simplicity, identical or identical parts or parts with identical or similar functions are provided below with the same reference signs.

Further advantages, features and details of the invention will become apparent from the following description, the preferred embodiments and the appended drawings.

DETAILED DESCRIPTION OF THE DRAWINGS

Figure 1:
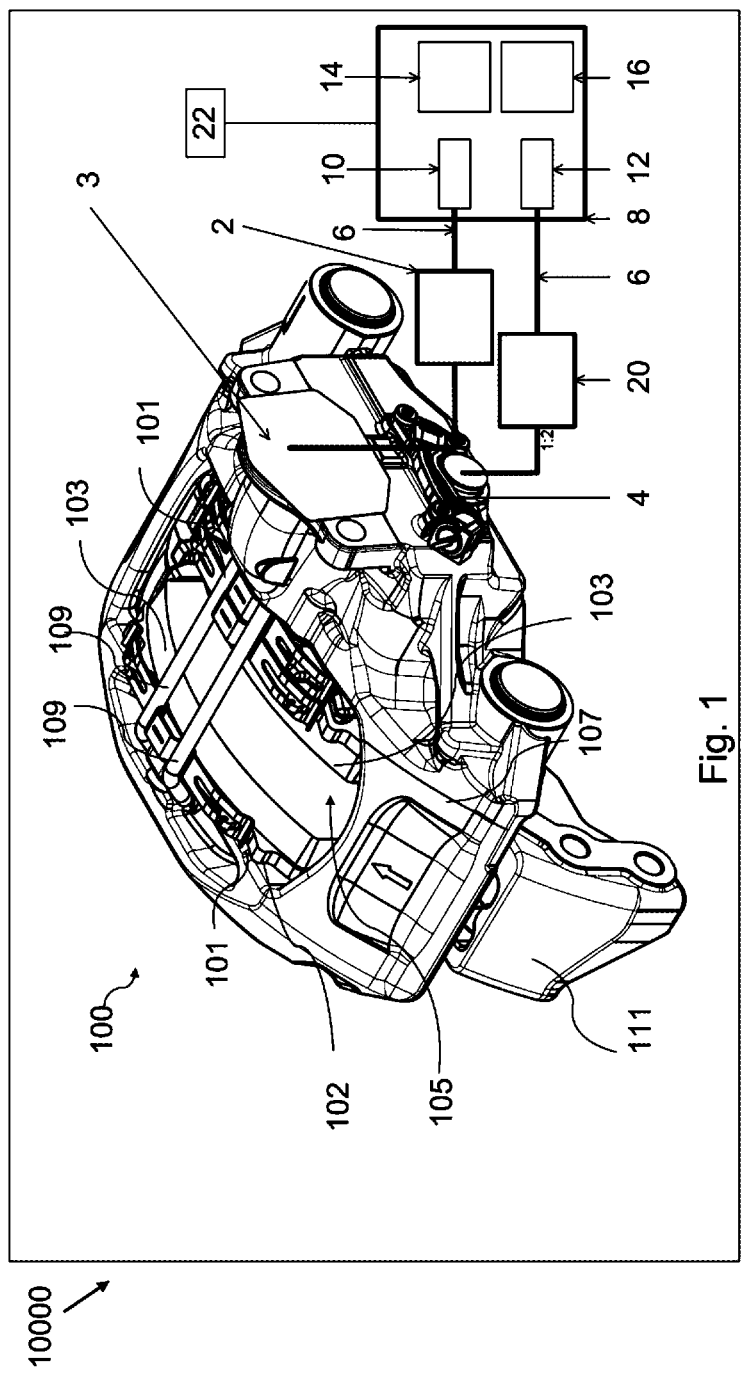
FIG. 1 shows a first exemplary embodiment of an electromechanical brake according to the invention with a control device for adjusting the clearance in a perspective view.

FIG. 1 shows a vehicle system 10000 having an electromechanical brake 100. The electromechanical brake 100 has a brake carrier 111 and a brake caliper 107. Brake pads 103 are guided and mounted on the brake carrier 111. By means of an electromechanical brake actuator 2, the brake pads 103 can be moved in the direction of a receiving space 105 for a brake disc (not shown) and can be applied to such a disc. The brake pads 103 are held in position by hold-down brackets 109 and hold-down springs 101. After removal of the hold-down bracket 109 and the hold-down springs 101, the brake pads 103 can be removed from the brake carrier 111 and can be replaced. The brake carrier 111 also has a pad retention plate 102 for laterally guiding the brake pads 103.

If the electromechanical brake 100 is in a non-actuated state, that is to say if no application force is applied to the brake pads 103 by the brake actuator 2, there is a clearance L between the brake pad 103 and the brake disc 105. The position at which at least one brake pad 103 comes into contact with the brake disc 105 is referred to as the contact position K. The brake 100 is applied by the application of an actuating force by the brake actuator 2 to an interface for an application mechanism 3, which in turn brings about application of the brake pads 103 in the direction of the brake disc 105.

The brake actuator 2 receives an actuator signal 22 for the actuation of the brake actuator 2. The brake actuator 2 is furthermore connected via a signal-conducting connection 6 to an interface 10 of a control device 8. The control device 8 determines with the actuator 2 a contact position K, in which the brake pads 103 come into contact with the brake disc 105. The control device 8 also has a data memory 14 and a processor 16. In addition, the control device 8 has a second interface 12, which is connected by means of a signal-conducting connection 18 to a clearance adjustment device 20, which is preferably configured as a stepping motor 20. The electric clearance adjustment device 20 is integrated into a wear sensor 4. The signal-conducting connections 6, 18 can be configured both as wired connections and as wireless connections.

Figure 2:
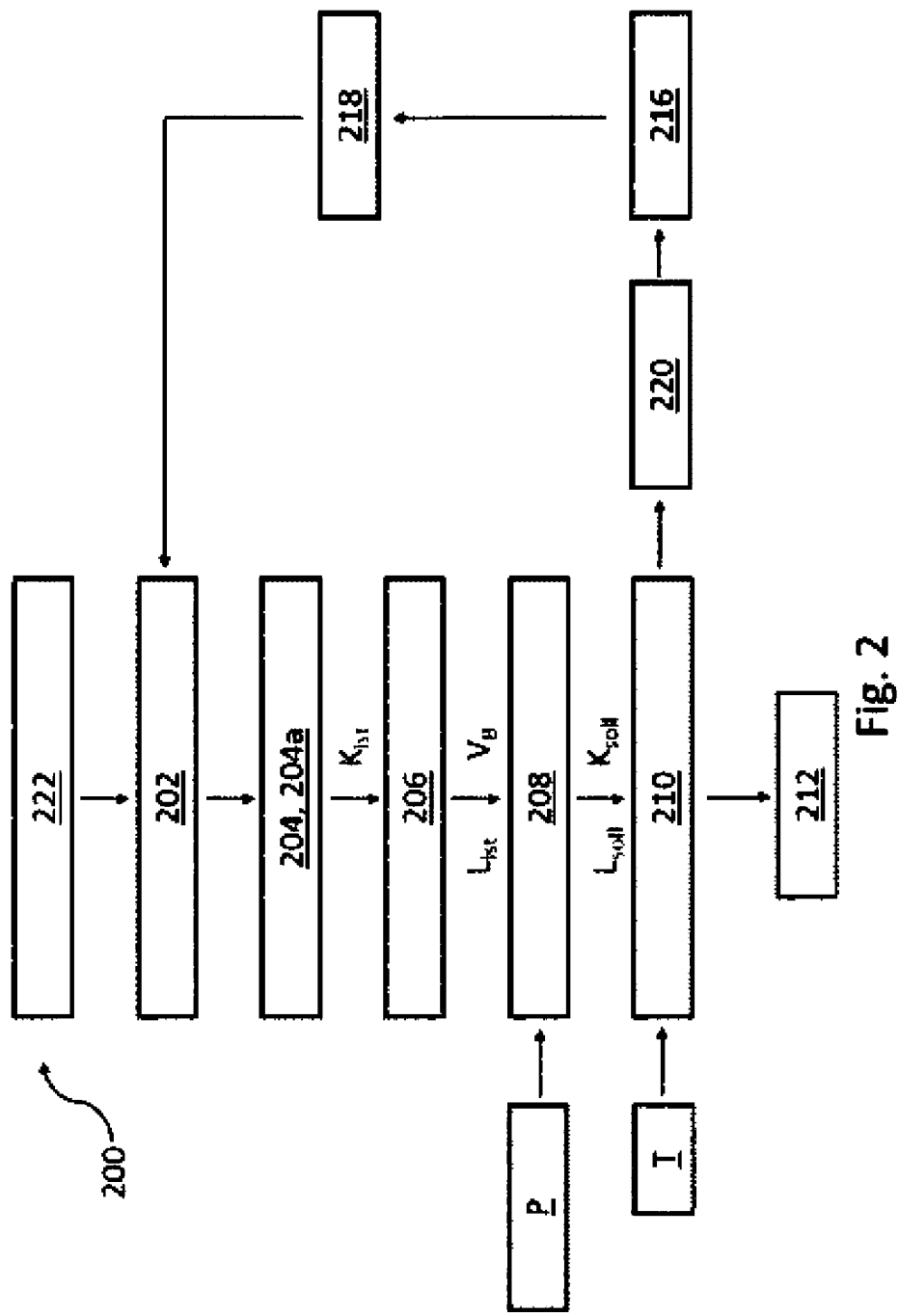
FIG. 2 shows a block diagram of a method for adjusting a clearance of an electromechanical brake.

A method 200 for adjusting a clearance of an electromechanical brake 100 according to FIG. 1 is illustrated in FIG. 2 using a block diagram. According to step 222, the method 200 is started by activating a vehicle ignition. With the activation of the vehicle ignition in method step 222, a clearance test cycle is activated in step 202. As part of this clearance test cycle, the brake actuator 2 applies the at least one brake pad 103 of the brake 100 in the direction of a brake disc 105 in accordance with step 204.

In step 204a, a contact position $K_{ist}$ is determined, at which the brake pad 103 comes into contact with the brake disc 105 during application. From the contact position $K_{ist}$, the clearance $L_{ist}$ and a degree of pad wear $V_B$ are determined in accordance with step 206.

Furthermore, according to step 208, a clearance $L_{soll}$ required for the brake 100 and a required contact position $K_{soll}$ are calculated as a function of the degree of pad wear $V_B$ determined, wherein predefined parameters P are used according to step 208. According to step 210, the determined contact position $K_{ist}$ is compared with the required contact position $K_{soll}$ and the determined clearance $L_{ist}$ is compared with the required clearance $L_{soll}$. In the case where the determined contact position $K_{ist}$ deviates from the required contact position $K_{soll}$ and/or the determined clearance $L_{ist}$ deviates from the required clearance $L_{soll}$ by less than a tolerance value T, a braking readiness signal 212 is generated.

In the case where the determined contact position $K_{ist}$ deviates from the required position $K_{soll}$ and/or the determined clearance $L_{ist}$ deviates from the required clearance $L_{soll}$ by more than the tolerance value T, a required clearance adjustment distance is calculated 216.

According to step 218, the clearance $L_{ist}$ is adjusted according to the calculated required clearance adjustment distance 216 and the clearance test cycle 202 is reactivated for the brake 100.

In the case where no contact position $K_{ist}$ or no clearance $L_{ist}$ can be found for which the determined contact position $K_{ist}$ deviates from the required contact position $K_{soll}$ and/or the determined clearance $L_{ist}$ deviates from the required clearance $L_{soll}$ by less than a tolerance value T, an error signal is generated according to step 220. The error signal according to step 220 can be output after a determinable number of unsuccessful cycle runs or on the basis of further parameters, for instance.

The calculation 216 of the required clearance adjustment distance 218 may furthermore comprise the determination of operating parameters for the electric clearance adjustment device 20, e.g. the specification of an adjustment step number or adjustment position for the electric drive (electric motor) of an electric clearance adjustment device 20.

Figure 3:
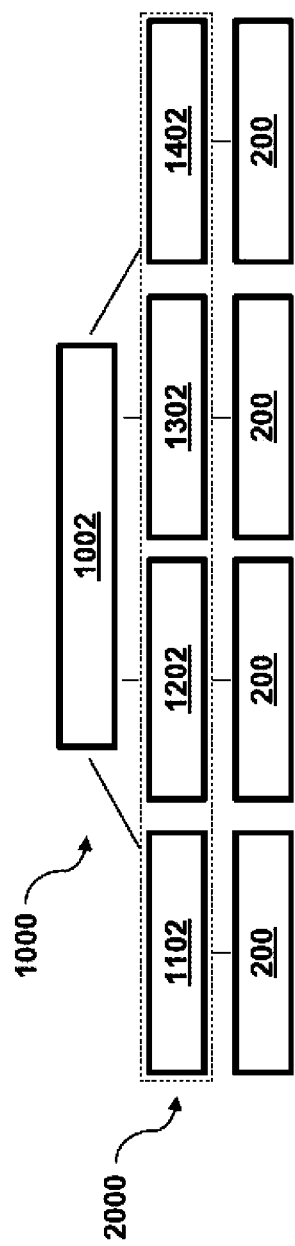
FIG. 3 shows a block diagram of a method for adjusting a clearance of electromechanical brakes of a vehicle.

FIG. 3 shows a method 1000 for adjusting a clearance L of electromechanical brakes 1102, 1202, 1302, 1402 of a vehicle 2000. Each of the brakes 1102, 1202, 1302, 1402 undergoes a method 200 for adjusting a clearance L of each electromechanical brake 1102, 1202, 1302, 1402.

According to step 1002, this involves coordination of the activation of the clearance test cycles of the brakes 1102, 1202, 1302, 1402. This coordination is preferably configured in such a way that only one of the brakes 1102, 1202, 1302, 1402 in each case undergoes the method 200 for adjusting a clearance of a brake. However, depending on the vehicle type, the operating mode, and other environmental conditions, it may furthermore be advantageous that two of the electromechanical brakes 1102, 1202, 1302, 1402, or even three of the relevant brakes 1102, 1202, 1302, 1402, respectively, simultaneously undergo the method 200 for adjusting a clearance.

The invention claimed is:

1. A method (200) for adjusting a clearance (L) of an electromechanical brake (100) of a vehicle, comprising the steps of:
activating (202) a clearance test cycle for the brake (100);
applying (204) a brake pad (103) of the brake (100) toward a brake disc (105) and determining (204a) a contact position ($K_{ist}$), at which the brake pad (103) comes into contact with the brake disc (105) during application (204);
determining (206) the clearance ($L_{ist}$) and a degree of pad wear ($V_B$) based on the determined contact position ($K_{ist}$);
calculating (208) a required clearance ($L_{soll}$) for the brake (100) and a required contact position ($K_{soll}$) of the brake pad (103) and brake disc (105) as a function of the degree of pad wear ($V_B$) using predefined parameters (P).

2. The method (200) as claimed in claim 1, further comprising the step of:
comparing (210) the determined contact position ($K_{ist}$) with the required contact position ($K_{soll}$) or comparing the determined clearance ($L_{ist}$) with the required clearance ($L_{Soll}$), and
upon determining that the determined contact position ($K_{ist}$) deviates from the required contact position ($K_{soll}$) or that the determined clearance ($L_{ist}$) deviates from the required clearance ($L_{soll}$) by less than a tolerance value (T), generating a braking readiness signal (212).

3. The method (200) as claimed in claim 2,
wherein, upon determining that the determined contact position ($K_{ist}$) deviates from the required contact position ($K_{soll}$) or that the determined clearance ($L_{ist}$) deviates from the required clearance ($L_{soll}$) by more than the tolerance value (T), a required clearance adjustment distance (216) is calculated.

4. The method (200) as claimed in claim 3, comprising the further steps of:
adjusting (218) the clearance ($L_{ist}$) according to the calculated required clearance adjustment distance (216);
reactivating the clearance test cycle (202) for the brake (100).

5. The method (200) as claimed in claim 4,
wherein, upon determining that no contact position ($K_{ist}$) or no clearance ($L_{ist}$) can be found for which the determined contact position ($K_{ist}$) deviates from the required contact position ($K_{soll}$) or for which the determined clearance ($L_{ist}$) deviates from the required clearance ($L_{soll}$) by less than a tolerance value (T), an error signal (220) is generated.

6. The method (200) as claimed in claim 4,
wherein the adjustment (218) of the clearance (L) is carried out by an electric clearance adjustment device (20).

7. The method (200) as claimed in claim 6,
wherein the calculation (216) of the required clearance adjustment distance (218) comprises determining operating parameters for the electric clearance adjustment device (20).

8. The method (200) as claimed in claim 1,
wherein the predefined parameters (P) comprise at least one of the following:
a brake characteristic curve; and
a stiffness characteristic map, in which state-dependent stiffness values are stored.

9. The method (200) as claimed in claim 1,
wherein the activation (202) of the clearance test cycle takes place each time when the vehicle is put into operation.

10. The method as claimed in claim 1, wherein the method (200) is carried out for each of a plurality of brakes (1102, 1202, 1302, 1402) present on the vehicle.

11. The method (1000) as claimed in claim 1, wherein the clearance test cycle is performed only for fewer than all electromechanical brakes (1102, 1202, 1302, 1402) present on the vehicle.

12. A non-volatile computer memory storing instructions causing a control device to perform the method (200, 1000) as claimed in claim 1.

13. The method as claimed in claim 1, wherein the calculation of the required clearance is based on a brake characteristic curve and/or a stiffness characteristic map and depending on the determined degree of pad wear, and wherein the required clearance according to the brake characteristic curve and/or the stiffness characteristic map is different at different wear levels and changes as wear levels increase, such that the required clearance for new brake pads is different than the required clearance for worn brake pads.

14. A control device (8) for determining a clearance (L) of an electromechanical brake (100), comprising:
   a first interface (10) for a signal-conducting connection (6) of the control device (8) to a brake actuator (2);
   a second interface (12) for a signal-conducting connection (18) of the control device (8) to an electric clearance adjustment device (20);
   a data memory (14) and a processor (16),
   wherein the control device (8) is configured
      to activate a clearance test cycle for the brake (100);
      to cause an application (204) of at least one brake pad (103) of the brake (100) toward a brake disc (105) via the brake actuator (2) and to determine a contact position ($K_{ist}$), at which the brake pad (103) comes into contact with the brake disc (105) during application (204);
      to determine the clearance ($L_{ist}$) and a degree of pad wear ($V_B$) based on the determined contact position ($K_{ist}$), and
      to calculate a required clearance ($L_{soll}$) for the brake (100) and a required contact position ($K_{soll}$) of the brake pad (103) and brake disc (105) as a function of the degree of pad wear ($V_B$) using predefined parameters (P).

15. The control device (8) as claimed in claim 14, wherein the control device (8) is configured
   to compare the determined contact position ($K_{ist}$) with the required contact position ($K_{soll}$) or the determined clearance ($L_{ist}$) with the required clearance ($L_{soll}$),
   upon determining that the determined contact position ($K_{ist}$) deviates from the required contact position ($K_{soll}$) or that the determined clearance ($L_{ist}$) deviates from the required clearance ($L_{soll}$) by less than a tolerance value (T), to generate a braking readiness signal (212), and
   upon determining that the determined contact position ($K_{ist}$) deviates from the required contact position ($K_{soll}$) or that the determined clearance ($L_{ist}$) deviates from the required clearance ($L_{soll}$) by more than a tolerance value (T), to calculate a required clearance adjustment distance (216).

16. The control device (8) as claimed in claim 15, wherein the control device (8) is configured
   to adjust the clearance (L) according to the calculated required clearance adjustment distance (216), and
   to reactivate the clearance test cycle (202) for the brake (100).

17. The control device (8) as claimed in claim 15,
   wherein the control device (8) is configured, upon determining that no contact position ($K_{ist}$) or no clearance ($L_{ist}$) can be found for which the determined contact position ($K_{ist}$) deviates from the required contact position ($K_{soll}$) or for which the determined clearance ($L_{ist}$) deviates from the required clearance ($L_{soll}$) by less than a tolerance value (T), to generate an error signal (220).

18. An electromechanical brake (100), having
   a brake disc (105),
   at least one brake pad (103) accommodated in a brake caliper (107),
   an electromechanical brake actuator (2) for applying the at least one brake pad (103) toward the brake disc (105),
   an electric clearance adjustment device (20) for adjusting a clearance (L) between the brake disc (105) and the brake pad (103), and
   a control device (8) as claimed in claim 12.

\* \* \* \* \*